United States Patent [19]

Sternina et al.

[11] Patent Number: 5,296,144

[45] Date of Patent: Mar. 22, 1994

[54] COMPOSITE MEMBRANE OF A HYDROPHILIC ASYMMETRIC MEMBRANE COATED WITH AN ORGANOSILOXANE BLOCK COPOLYMER

[75] Inventors: Larisa F. Sternina; Victor Mikhailovich; Alexander F. Fedotov; Mark I. Shkolnik; Vera V. Strukova, all of Moscow, U.S.S.R.

[73] Assignee: World Trade Corporation, New City, N.Y.

[21] Appl. No.: 816,187

[22] Filed: Jan. 2, 1992

[51] Int. Cl.$^5$ ............................................. B01D 71/80
[52] U.S. Cl. ............................... 210/490; 210/500.28; 210/640
[58] Field of Search ............... 210/640, 490, 500.27, 210/500.28; 427/246; 525/489; 424/447

[56] References Cited

U.S. PATENT DOCUMENTS

| | | | |
|---|---|---|---|
| 4,591,440 | 5/1986 | Higashimura | 210/640 |
| 4,600,751 | 7/1986 | Lee et al. | 525/489 X |
| 4,728,429 | 3/1988 | Cabasso | 210/638 |
| 4,906,169 | 3/1990 | Chien et al. | 424/447 X |

OTHER PUBLICATIONS

Kimura et al., "Pervaporation of Organic Substance Water System With Silicone Rubber Membrane," 8(3) *Membrane*, pp. 177-183 (1983).

Toshihiro Hirotsu et al., "Water-Ethanol Permseparation by Pervaporation through Photocrosslinked Poly(vinyl Alcohol) Composite Membranes,"]vol. 36, *Journal of Applied Polymer Science*, pp. 1717-1729 (1988).

Aptel et al., "Liquid Transport Through Membrane Prepared by Grafting of Polar Monomers onto Poly(tetrafluoroethylene) Films," vol. 16, *Journal of Applied Polymer Science*, pp. 1061-1076 (1972).

*Primary Examiner*—Frank Spear
*Attorney, Agent, or Firm*—Morgan & Finnegan

[57] ABSTRACT

An organosiloxane block copolymer having the formula depicted (I) depicted below:

$$HO \leftarrow \left[ R^1 - OCNH - R - NHCO \right]_x R^2(SiO)_m -$$

(with Me substituents)

$$-(SiO)_n - SiR^2 - OCNH - R - NHCO \right]_y R^1 OH$$

wherein:
m has a value of 8.0–18.0;
n has a value of 1.0–5.0;
x has a value of about 0.2 to about 0.7;
y has a value of 1 minus the value of x;
R is (diphenylmethane group: two phenyl rings connected by $-CH_2-$)

R$^1$ is $-CH_2CH_2NCH_2CH_2-$ (attached to a phenyl ring with $-CH_3$)

R$^2$ is a C$_1$–C$_5$ lower alkylene group;
V is a vinyl group; and
Me is a methyl group.

Preparation of the organosiloxane block copolymer of the above formula (I) by polymerizing a,w-bis(oxymethyl)polydimethyl-methylvinylsiloxane, and diphenylmethanediisocyanate, and di(oxyethyl)m-toluidine in the presence of a solvent and a catalyst. A composite membrane, which may be used in a pervaporation process, comprising a hydrophilic asymmetric membrane coated with a mixture of an organosiloxane block copolymer, a linking reagent and a catalytically effective amount of a hydrosilylation catalyst.

12 Claims, 1 Drawing Sheet

FIG. 1

COMPOSITE MEMBRANE OF A HYDROPHILIC ASYMMETRIC MEMBRANE COATED WITH AN ORGANOSILOXANE BLOCK COPOLYMER

FIELD OF THE INVENTION

The present invention relates to an organosiloxane block copolymer, to a composite membrane of a hydrophilic asymmetric membrane coated with an organosiloxane block copolymer and to a process for using such composite membrane in separating liquid mixtures.

BACKGROUND OF THE INVENTION

Azeotropic mixtures or close boiling mixtures have been conventionally separated by large scale multistage distillations or, sometimes, by combined processes such as extractive distillation. These separation processes are generally characterized by high energy demands, relatively large capital plant investments, a variety of maintenance problems, and severe environmental pollution problems whose solution contribute to the energy usage.

Attention has recently been focused on mixtures produced as by-products of the chemical and petroleum industries. Separation of these mixtures into their components has frequently been difficult and consequently certain of the by-products have been deemed as expendable and disposable. The development of a low cost technique for separating such by-product mixtures would clearly be of great benefit.

Conventional separation techniques such as distillation, adsorption, liquid-liquid extraction and crystallization are often insufficient and uneconomical. Application of separation processes which involve the use of porous and/or semi-permeable membranes for separating compounds can save in process costs because energy consumption is low, raw materials and nutrients can be recovered and reused, fermentation processes can be carried out continuously, and disposal problems can be reduced or eliminated. The separation processes using membrane technology include: ultrafiltration, reverse osmosis, pervaporation and electrodialysis, in combination with distillation.

Ultrafiltration is employed to separate colloidal particles according to their particle size (preferably, 10 microns to 10 nanometers). The process involves feeding a liquid mixture through a microporous membrane while both sides of the membrane are maintained at high operating pressure, e.g., 7 bars. Reverse osmosis involves feeding a liquid mixture on one side of a membrane at high operating pressures, e.g., 7 bars, while maintaining the system on the opposite side of the membrane at atmospheric pressure. Thus, the resulting permeate remains in the liquid phase. Suitable conventional reverse osmosis membranes consist of cellulose derivatives. A disadvantage of the reverse osmosis and ultrafiltration process employing conventional membranes is that the highest concentration of the liquid mixture that can be obtained is about 20% due to the high osmotic pressure requirements.

The pervaporation process involves feeding a liquid mixture on one side of a membrane at atmosphere pressure, while maintaining the system on the opposite side of the membrane at a sufficiently low vapor pressure to vaporize one liquid component by employing a vacuum pump or an inert gas flow. The resulting component (permeate) that is permeated through the membrane is vaporized and is collected in a gaseous state. The advantages of this process is that it can be applicable to the separation of azeotropic mixture that cannot be separated by an ordinary distillation, to the separation of a mixture of compounds having close boiling points, to the concentration of a compound which is sensitive to heat, or to the separation of isomers. Moreover, unlike reverse osmosis, these separations or concentrations are applicable over the entire range that is to be treated.

For the pervaporation processes, the efficiency of the membrane is evaluated by the permselectivity which is measured by the permeability flow rate (flux) and the separation factor (selectivity). The separation factor (S. F.) is defined as the ratio of the concentration of two substances A and B in the permeate divided by the ratio of the concentration of the same substances in the feed. Specifically, for separation of water-alcohol mixtures, the separation factor (S. F.) is calculated according to the following equation:

S. F. $=(Yw/Yal)/(Xw/Xal)$ where:
Yw: concentration of water in the permeate
Yal: concentration of alcohol in the permeate
Xw: concentration of water in the feed
Xal: concentration of alcohol in the feed Two types of membranes have been conventionally employed for the separation of water-alcohol mixtures in the pervaporation process: water-permselective membranes and alcohol-permselective membranes. For alcohol dehydration, water-permselective membranes are employed and the permeate is water. Thus, water is in the saturating vapor phase. Processes using conventional water-permselective membranes employ mixtures containing up to about 10% water. In contrast, when alcohol-permselective membranes are employed, the permeate is alcohol. Thus, alcohol is in the saturating vapor phase. Processes using conventional alcohol-permselective membranes employ mixtures containing up to about 10% alcohol.

Alcohol-permselective membranes are conventionally hydrophobic. U.S. Pat. No. 4,591,440 to Higashimura describes one such membrane, a substituted acetylene polymer membrane. Higashimura's data shows that, in the process of evaporating mixtures having a water concentration of 90% through his substituted acetylene polymer membranes, the separation factor equals 0.033 and the permeability flow rate equals 1.91 kg/h.m$^2$. In addition, Higashimura describes a method of producing his membranes which is time consuming and inefficient. Kimura et al., 8(3) *Membrane* 177-83 (1983) describes a hydrophobic membrane made of silicone rubber. Kimura's data shows that, in the process of evaporating mixtures with water concentrations of 90% through silicone rubber membranes, the permeability flow rate equals 0.140 Kg/h.m$^2$.

Comparative Example 2 of U.S. Pat. No. 4,591,440 describes a composite membrane consisting of a hydrophobic coating grafted on a chemically inert membrane, e.g., polytetra-fluoroethylene ("PTFE"). This composite membrane is prepared by applying a silicone rubber coating (500 micrometer thick) on a PTFE base and then exposing it to U. V. light at room temperature to obtain a uniform film of approximately 70 micrometers thick. In the process of evaporating water-ethanol mixtures having a water content of 90% and with the vapor phase saturated with ethanol, the separation factor equals 0.14 and the permeability equals 0.067 kg/h.m$^2$.

As the above references demonstrate, the conventional alcohol-permselective membranes have numerous disadvantages. One disadvantage is the small operating range for membrane concentrating efficiency (up to 15% of alcohol). Another disadvantage is the low alcohol permselectivity. Further, as the alcohol concentration in the feed rises above 15%, the alcohol permselectivity through the membrane decreases substantially.

Conventionally, the art teaches that water-permselective membranes are hydrophilic membranes in order to preferentially attract the water. See Toshihiro et al., 36 *Journal of Applied Polymer Science* 1717 (1988). Examples of conventional hydrophilic membranes are polyalcohols, polyamides, polyethers and polyesters. Aptel et al., 16 *Journal of Applied Polymer Science* 1061 (1972) describe a water permselective membrane made from a hydrophilic membrane of cellulose acetate. When evaporating a water-ethanol mixtures having a water content of 4%, Aptel's data shows a separation factor equaling 3.0 and a permeability flow rate equaling 0.29 kg/h.m$^2$.

Hirotsu et al., 36 *Journal of Applied Polymer Science* 717 (1988) describes a hydrophilic membrane composed of polyvinyl alcohol crosslinked by fluorescent light. When evaporating a water-ethanol mixture having a water content of 10% through such membranes, Hirotsu's data shows a separation factor equaling 21 but a permeability flow rate equaling only 0.02 kg/h.m$^2$. Moreover, for evaporating mixtures having a water content of 0.5% through such membranes, Hirotsu's data shows a separation factor equaling 170 but a permeability flow rate dropping to zero.

Hirotsu et al., 6(12) *Research Institute Polymer Text, Japan*, 33 (1986) describe a hydrophilic composite membrane prepared by coating a photocrosslinkable acrylic acid on a porous polypropylene film. When evaporating water-ethanol mixture having a water content of 10% through such membrane, Hirotsu's data shows a separation factor equaling 36 and a permeability flow rate equaling 0.1 kg/h.m$^2$.

U.S. Pat. No. 4,728,429 to Cabasso et al. describes a method of preparing a hydrophilic membrane from a sulfonated ion-exchange polyalkylene. When evaporating a water-ethanol mixture having a water content of 14.6% through such a membrane, Cabasso's data shows a separation factor equaling 725 and a permeability flow rate equaling 0.152 kg/h.m$^2$.

As the above references illustrate, conventional water-permselective membranes have numerous disadvantages. One is, as the concentration of alcohol in the feed increases, the permeability flow rate through the membrane substantially decreases. That decrease is believed to be characteristic for all conventional water permselective membranes because, as the liquid passes through the membrane, the membrane swells. Thus, when the water content decreases below 10%, the permeability rate decreases substantially. As a result, such membranes generally cannot be used to effectively remove all the water from an alcohol-water mixture. Therefore, these membranes cannot effectively be used for alcohol dehydration.

SUMMARY OF THE INVENTION

1. Objects Of The Invention

It is an object of the present invention to provide highly effective composite membranes capable of being used in separating liquid mixtures.

Another object of the present invention is to provide highly effective composite membranes capable of being used to achieve almost complete separation and dehydration of water/alcohol mixtures in one stage at high flux rates.

A further object of the present invention is to provide highly effective composite membranes capable of being used in separating liquid mixtures at increased permeability flow rates and at increased separation efficiency as feed temperatures increase.

Still another object of the present invention is to provide highly effective composite membranes which can be used in pervaporation processes at high residual pressures.

Another object of the present invention is to provide an efficient process for preparing highly effective composite membranes.

Still another object of the present invention is to provide highly effective composite membranes capable of being used in dehydration of a water-alcohol mixture having a water content ranging from high to very low.

A further object of the present invention is to provide a process for preparing highly effective composite membranes consisting of a coating linked on a membrane.

An additional object of the present invention is to provide a process for preparing polymers that are capable of being used as a coating on the composite membrane of the present invention.

2. Brief Description of the Invention

The present invention relates to composite membranes, to organosiloxane block copolymers for use in preparing the composite membranes, to processes for preparing the composite membranes and organosiloxane block copolymers, and to processes for separating liquid mixtures with the composite membranes. According to the present invention, there is provided an organosiloxane block copolymer of poly(methylvinyl)siloxane urethane having the structural formula (I) depicted below:

wherein: m has a value of 8.0–18.0;
n has a value of 1.0–5.0;
x has a value of about 0.2 to about 0.7;
y has a value of 1 minus the value of x;
R is R$^1$ is $R^2$ is a $C_1$-$C_5$ lower alkylene group;
V is a vinyl group; and
Me is a methyl group.

The above organosiloxane block copolymer may be prepared by polymerizing an organosiloxane polymer of α-w-bis(oxymethyl)-polydimethylmethylvinylsiloxane and 4,4'-diphenylmethanediisocyanate and N,N-di(oxyethyl)m-toluidine in the presence of a solvent and a catalyst.

A composite membrane, useful for separating liquid mixtures, comprises a hydrophilic asymmetric membrane coated with a mixture of the organosiloxane block copolymer, a linking reagent and a catalytically effective amount of a hydrosilylation catalyst.

The above composite membrane may be prepared by:
(a) dissolving the organosiloxane block copolymer and the linking reagent in a solvent to form a first solution;
(b) adding a catalytically effective amount of a hydrosilylation catalyst to the first solution to form a second solution;
(c) coating the hydrophilic asymmetric membrane with the second solution;
(d) allowing the coated composite membrane to swell; and
(e) drying the swollen coated composite membrane.

The process for separating a liquid mixture comprises the step of passing a liquid mixture through the above composite membrane.

DETAILED DESCRIPTION OF THE INVENTION

"Siloxane" and "organosiloxane" are terms used in Noll, *Chemistry and Methodology of Silicones*, (Academic Press, Inc.:1968). A siloxane unit is defined as a Si-O-Si unit. An organosiloxane consists of one, two or three organic groups attached to the silicon atom.

According to the present invention, the composite membranes are useful for separating liquids and are particularly useful for dehydrating organic liquids and mixtures of organic liquids.

Suitable organic liquids which can be dehydrated through use of the composite membrane of the present invention include alcohols, ethers, organic acids such as carboxylic acid, sulfonic acid, dicarboxylic acids, keto acids or hydroxy acids, aldehydes, ketones, acid chlorides, acid anhydrides, amides, esters, amines, phenols, aryl halides, glycols, α,B-unsaturated carbonyl compounds.

The present invention has been found to be suitable for separating water-alcohol mixtures, particularly water-ethanol mixtures. Moreover, for liquid mixtures containing water, the present invention is particularly useful for employing water as the permeate.

Suitable alcohols which can be dehydrated through use of the composite membranes of the present invention include methyl, ethyl, n-propyl, n-butyl, n-pentyl, n-hexyl, n-heptyl, n-octyl, n-decyl, lauryl, myristyl, cetyl, isopropyl, isobutyl, sec-butyl, tert-butyl, isopentyl, tert-pentyl, crotyl, cyclopentanol, cyclohexanol, benzyl, a-phenylethyl, β-phenylethyl, and cinnamyl alcohols. Other alcohols that form liquid mixtures are also believed applicable.

The poly(methylvinyl)siloxane urethane block copolymer of the present invention has the structural formula (I) depicted below:

wherein: m has a value of 8.0–18.0;
n has a value of 1.0–5.0;
x has a value of about 0.2 to about 0.7;
y has a value of 1 minus the value of x;
R is $R^1$ is $R^2$ is a $C_1$-$C_5$ lower alkylene group;
V is a vinyl group; and
Me is a methyl group.

In one preferred embodiment, the organosiloxane block copolymer has the structural formula (I) wherein m has a value of 14.0, n has a value of 1.0, x has a value of about 0.224 and $R^2$ is —$CH_2$—(throughout, x and y are mole fractions). In another preferred embodiment, the organosiloxane block copolyer has the structural formula (I) wherein m has a value of 13.0, n has a value of 2.0, x has a value of about 0.369 and $R^2$ is —$(CH_2)_3$—. In a further embodiment, the organosiloxane block copolymer has the structural formula (I) wherein m has a value of 10.0, n has a value of 5.0, x has a value of about 0.424 and $R^2$ is —$CH_2$—. In another embodiment, the organosiloxane block copolymer has the structural formula (I) wherein m has a value of 18.0, n has a value of 1.0, x has a value of 0.182 and $R^2$ is —$CH_2$—.

Preparation of the polymer of formula (I) is carried out by adding about three parts by weight of an organosiloxane polymer of α, w - bis(oxymethyl)polydimethylmethylvinylsiloxane of the formula $HOCH_2$—$(Me_2SiO)_m$—(Me Vinyl $SiO)_n$—$SiMe_2CH$—OH [wherein m+n has a value between about 10.0 and about 20.0, n has a value between about 1.0 and about 5.0 and the molecular weight equals about 900 to about 1700]to about one part by weight of 4,4'- diphenylmethanediisocyanate and a sufficient amount of di(oxyethyl)m-toluidine to achieve equimolar ratio of the —OH— group to —NCO— groups The above compounds are combined in a solvent. Suitable solvents include proton solvents such as tetrahydrofurane, dioxane, chloroform and, more particularly, methylene chloride. The reaction is carried out in the presence of about 0.02-0.05% by weight of a catalyst such as dibutyldicaprilate tin or dioctoate tin, at a temperature between about 30° C. and 45° C. preferably at about 40° C., for about 1 to 2 hours, preferably about 1½ hours. Subsequently, the reaction mixture is cooled to between about 20°-25° C., poured on a base for drying purposes and dried at about 80° C. until the polymer reaches a constant weight. Suitable bases for drying the polymer include bases with low adherence [to avoid sticking of polymer to base], preferably, a polytetrafluoroethylene base, more particularly, polyethylene base.

Examples of manufacturers of α- w -bis(oxymethyl)-polydimethylmethylvinylsiloxane are GNIIHTEOS (Soviet Union) and Union Carbide. The general synthesis reaction involves the following:

Preparation of the composite membrane is carried out by dissolving, in a solvent, about 100 parts by weight of an organosiloxane block copolymer in about 1 to about 5 parts, preferably between about 2 parts to about 4 parts, by weight of a linking reagent to form a solution. Suitable linking reagents include hydride-containing siloxanes, preferably oligohydride ethylsiloxane. The preferred solvent is toluene or methylene chloride. Dissolution is generally carried out at about 20° C. After, the polymer is completely dissolved, a catalytically effective amount of a hydrosilylation catalyst is thoroughly mixed into the solution. Suitable hydrosilylation catalysts include platinum complexes such as platinum (IV) [$(C_8H_{17})_3C_6H_5CH_2N)_2Pt(NO_2)_4$], olefin platinum complexes [$PtCl_2(PhCH=CH_2)_2$]and, preferably, chloroplatinic acid [$H_2PtCl_6 \cdot 6H_2O$]. A catalytically effective amount of a hydrosilyation catalyst may be between about 5 and about 50 ppm by weight of dry copolymers, preferably between about 10 and about 40, and more preferably between about 20 and about 30. Subsequently, the solution is then linked to the hydrophilic asymmetric membrane by pouring the solution over the active surface (skin) of the hydrophilic asymmetric membrane, by allowing it to remain on the membrane surfaces for about 10 minutes, and then by pouring off the excess solution. As a result, the hydrophilic asymmetric membrane swells. Afterwards, the composite membrane is dried at a temperature starting at about 20° C. and increasing to about 120° C for a total time of about 30 minutes. Alternatively, the composite membrane is dried in two stages, e.g., for about 20 minutes at about 20° C. to about 25° C. and then for about 10 minutes at about 120° C. The actual time and temperature for the drying is selected by taking into consideration the rate of consumption of the Si-H and Si-Vinyl groups, which were measured by employing infra-red and atomic magnetic resonance spectroscopy. Preferably, the coating process is repeated at least twice.

In one preferred composite membrane of the present invention, the organosiloxane block copolymer that is capable of being used in preparing the composite membrane has the formula (I) wherein m has a value of 14.0, n has a value of 1.0, x has a value of about 0.224 and $R^2$ is —$CH_2$—. In another preferred embodiment of the composite membrane of the present invention, the organosiloxane block copolymer that is capable of being used in preparing the composite membrane has the formula (I) wherein m has a value of 13.0, n has a value of 2.0, x has a value of about 0.369 and $R^2$ is —$(CH_2)_3$—. In a further embodiment of the composite membrane of the present invention, the organosiloxane block copolymer that is capable of being used in preparing the composite membrane includes an organosiloxane block of 70% by weight and 0.42 dl/g adjusted viscosity, and has the formula (I) wherein m has a value of 10.0, n has a value of 5.0, x has a value of about 0.424 and $R^2$ is —$CH_2$—. In another embodiment of the composite membrane of the present invention, the organosiloxane block copolymer that is capable of being used in preparing the composite membrane includes an organosiloxane block of 80% by weight and 0.18 dl/gm adjusted viscosity, has the formula (I) wherein m has a value of 18.0, n has a value of 1.0, x has a value of 0.182 and $R^2$ is —$CH_2$—.

Other suitable organosiloxane block copolymers that are capable of being used in preparing the composite membrane of the present invention include an organosiloxane block copolymer having the general formula

—[A—B]— wherein: A is an organosiloxane polymer having at least one vinyl group bonded to at least one silicon atom in the organosiloxane polymer, and B is an organic block polymer, which is defined as an organic polymer block other than an organosiloxane polymer defined as A.

As an example, B may be an organic block polymer selected from the group consisting of either:

(a) polycarbonate having the structural formula:

where k has a value of 7–12 and each $R^3$ is selected from the group consisting of a $C_1$–$C_5$ lower alkylene or where the $R^3$ groups in combination are

(b) polysulphone having the structural formula where k has a value of 7–12 and $R^3$ is a compound selected from the group consisting of $C_1$–$C_5$ lower alkylene or where the $R^3$ groups in combination are (c) polyurea having the structural formula (d) polyether having the structural formula where l has a value of 1–3 and $R^3$ is a compound selected from the group consisting of a $C_1$–$C_5$ lower alkylene; and (e) polyimide having the structural formula where k has a value of 7–12.

In another example, A may be an organosiloxane polymer having the structural formula depicted below:

wherein:

m has a value of 8.0–18.0;

n has a value of 1.0–5.0;

Me is a methyl group or hydrogen;

l has a value of 1–3; and v is at least one vinyl group with the remaining compounds selected from he group consisting of vinyl and Me.

Other suitable organosiloxane block copolymers that are capable of being used in preparing the composite membrane of the present invention, in addition to the above organosiloxane block copolymers, include

(a) polycarbonate-polysiloxanes,

(b) polysulphone-polysiloxanes, (c) polyurea-polysiloxanes,

(d) polyether-polysiloxanes.

The general polymerization reactions for the above organosiloxane block copolymers include

(a) for the polycarbonate-polysiloxanes block copolymer:

(b) for the polysulphone-polysiloxane block copolymer:

(c) for the polyurea-polysiloxane block copolymer:

(d) for the polyether-polysiloxane block polymer:

-continued wherein: m has a value between 8.0 and 18.0;
n has a value between 1.0 and 5.0;
Me is a methyl group;
V is a vinyl group;
l has a value between 1 and 3; and
k has a value between 7 and 10.

Suitable linking reagents that are capable of being used in the present invention are selected so that the organosiloxane block copolymer is linked on the assymetric membrane surface. This results in a coating that is substantially resistant to the influence of organic solvents. Suitable linking reagents include hydride-containing siloxanes, preferably, an oligohydride ethylsiloxane polymer [Me$_3$SiO—(HSi:Ethyl O—)$_n$ —SiMe$_3$ where n has a value of about 10 to about 20]. Although the inventors believe that the oligohydride ethylsiloxane may only be available in Russia, an analogue to this polymer, which is oligohydride methylsiloxane polymer [Me$_3$SiO—(HSiMeO—)$_n$SiMe$_3$ where n has a value of about 10 to about 20],is a suitable linking reagent for use in the present invention. The latter is available from Dow Corning as "DC 1107", Shin-Ethsy as "KF 99", Bayer as "MH 14", Goldshmidt as "Tegiloxane" PTF 1 or PTF 16", and Union Carbide as "L-31".

The inventors believe that the process of linking the organosiloxane block copolymer to the asymmetric membrane surface in the presence of the catalyst involves breaking the double bond of the vinyl group and linking the silicon atoms of the polymers. The inventors believe the reaction process consists of:

wherein:
m has a value between 8.0 and 18.0;
n has a value between 1.0 and 5.0;
Me is a methyl group;

Vi is a vinyl group;
l has a value between 1 and 3; and
f has a Value between 1 and 3.

Asymmetric membranes typically consist of (a) "skin" consisting of a homogeneous or a microporous structure, which is the active surface of the membrane and (b) a highly porous (100 to 200 μm) thick sublayer, which only acts as a support. See H. Strathmann, Membrane Separation Processes, *J. Membrane Science.* p. 121-189 (1981). The "skin" of the membrane is usually thin (0.1 to 2 μm) and it is the layer that is used for contacting the liquid phase for separation.

Suitable materials for hydrophilic asymmetric membranes that are capable of being applied to the present invention include cellulose acetate, polyamides, polysulphones, polyamide-imide, polypropylene and other hydrophilic polymers. Suitable hydrophilic assymetric membranes that are capable of being applied to the present invention include reverse osmosis cellulose acetate asymmetric membranes, polyamide membranes and polyamide-imide asymmetric membranes. Manufacturers of such hydrophilic asymmetric membranes include DuPont, Millipore and Polymersyntex. Hydrophilic asymmetric membranes that are particularly suited for the present invention include: (a) reverse osmosis cellulose acetate membranes including type "MGA-P" manufactured by Polymersyntez; types "EA", "EH" and "EG" manufactured by Millipore; MF types "AA", "DA", "HA", "GS" and "VM" manufactured by Millipore; and type "CA-398-3" manufactured by Eastman Kodak Chemcials; (b) reverse osmosis polyamidic-polysulphonamidic membranes including type "OPMN-KM" manufactured by Polymersyntez; type "S-30" manufactured by Dorr-Oliver; and "Acrodic-13" manufactured by Gelman Science, and (c) (poly)amide-imidic membranes.

In general, thinner membranes permit higher rates of permeation. However, as is known, the membranes must have adequate strength and stability to facilitate handling and to minimize development of fractures or weak points while in use. Preferably, the thickness of the composite membranes after coating according to the invention is between about 50 and about 200 micrometers, preferably between about 60 and about 100 micrometers, more preferably between about 70 and about 80 micrometers.

Composite membranes of the present invention can be supported by any known supporting substrate in the appropriate structural forms. However, hollow fibers do not require a supporting substrate.

The composite membranes of the present invention may be used in the form of films, tubes, tubing or hollow fibers in order to increase surface area and in order to achieve a maximum membrane surface area per unit volume, thus permitting the use of smaller equipment. Reverse osmosis membranes in the form of hollow fibers, when used in this invention, may have a diameter between about 200 and about 800 micrometers, preferably between about 300 and about 600 micrometers. Composite membranes in the form of tubes, when used in this invention, have a diameter between about 1.5 centimeters and about 2.0 centimeters. However, the present invention is not limited to the form of the membrane employed.

The separation processes using the present invention can be carried out, as known in the art, both discontinuously and continuously. Likewise, they may be carried out in one stage or several stages, for example, in the form of a separation cascade with any desired number of separating stages. For economic dehydration of a particular water-ethanol mixture, the process of this invention can be combined with conventional processes. For example, a conventional distillation process can be used to remove water until the ethanol concentration has reached a dehydration of about 65% by weight of the mixture. Then the process of the present invention may be employed to remove the remaining water from the mixture.

Specific embodiments illustrating preparation, formulation and application of the present invention in the separation process of this invention are set forth below without necessarily limiting the scope of the invention.

EXAMPLE 1

This Example illustrates the preparation of the organosiloxane polymer of poly(methylvinyl)siloxane urethane with an organosiloxane block of 75% by weight.

At room temperature, 51.20 grams (0.0427 mol.) of α-w-bis(oxymethyl)polydimethylmethylvinylsiloxane having a molecular weight of 1200 and a (SiMeViO) to (SiMeO) ratio of 1.1 to 14.1, 14.74 grams (0.055 mol.) of 4,4-diphenylmethanediisocyanate, 1.7 grams (0.009 mol.) of N,N-di(oxyethyl)m-toluidine and 80 grams of dried and newly distilled methylene chloride were placed in a four-neck flask (equipped with agitator, thermometer, reverse cooler, tube connected to an argon supply and drop funnel).

After the mixture was heated to 45° C., 0.025 grams (0.00004 mol.) of dibutyldicaprilate tin was added and the mixture was maintained at 45° C. and agitated for 1½ hours. Subsequently, 0.885 grams (0.0045 mol.) of N,N-di(oxyethyl)m-toluidine dissolved in 27 grams of methylene chloride was gradually added over a period of 2 hours to the heated mixture with stirring. Afterwards, the heating was stopped and the flask was cooled to 20° C. Subsequently, the reacted product was poured onto a polyethylene open flat mold (100 square cm area) and dried at 80° C. until the product reached a constant weight. The resulting polymer had formula (I) wherein $R^2$ is —$CH_2$—, "m" has the value of 14.0, "n" has the value of 1.0, and "x" has the value of 0.224. The yield was 64.93 grams (96.1% yield), the adjusted viscosity was 0.28 dl/g, and the organosiloxane block was 75% by weight.

EXAMPLE 2

This Example illustrates the preparation of the organosiloxane polymer of poly(methylvinyl)siloxane urethane with a organosiloxane block of 70% by weight.

At room temperature, 15.74 grams (0.0117 mol.) of -w-bis(oxymethyl)polydimethylmethylvinylsiloxane having a molecular weight of 1250 and SiMeVinylO to SiMeO ratio of 2.0 to 13.0, 5.068 grams (0.0203 mol.) of 4,4'-diphenyl-methanediisocyanate, 1.305 grams (0.0665 mol) of N,N-di(oxyethyl) m-toluidine and 30 grams of dried and newly distilled methylene chloride were placed in a four-neck flask (equipped with agitator, thermometer, reverse cooler, tube connected to an argon supply and drop funnel).

After heating the mixture to 45° C., 0.008 grams (0.00001 mol.) of dibutyldicaprilate tin was added to the mixture and the mixture was agitated for 1½ hours at 45° C. Subsequently, 0.38 grams (0.0193 mol.) of N,N-di(oxyethyl), m-toluidine dissolved in 9 grams of methylene chloride was gradually added to the mixture at 45° C. over a period of 2 hours with stirring. Afterwards, the heating was stopped and the flask was cooled to 20° C. Subsequently, the reaction product was poured onto a polyethylene open flat mold (area of 100 square cm). The resulting polymer was dried at 80° C. until the polymer reached a constant weight. The resulting polymer had formula (I) wherein "m" has the value of 13.0, "n" has the value of 3.0, "x" has the value of 0.369 and $R^2$ is —$(CH_2)_3$—. The yield was 96.8%, the adjusted viscosity was 0.42 dl/g, and the organosiloxane block was 70% by weight.

EXAMPLE 3

This Example illustrates the preparation of a composite membrane comprising a cellulose acetate hydrophilic asymmetric membrane coated with a mixture including the polymer produced in Example 1.

0.5 grams of the organosiloxane block copolymer of Example 1 [organosiloxane block of 75% by weight], 0.005 grams of oligohydride ethylsiloxane (product 136-41, TU-10834-76 manufactured by Chemical Plant of Dankov, USSR) and 17.0 grams of toluene were placed in a flask (equipped with an agitator and a reverse cooler). The mixture was stirred for 8 hours at about 20° C. until the polymer was completely dissolved.

A catalyst of 0.1 ml of chloroplatinic acid in a solution of 0.05 mol/l of tetrohydrofuran was added. The resulting mixture was stirred for an additional 10 minutes at 20° C. One-half of the resulting mixture (2.8% concentration of polymer) was poured onto a horizontally placed surface of a reverse osmosis cellulose acetate asymmetric membrane (50 square cm in area and 150 micrometers thick) at room temperature. The base was type "MGA-P" sold under the tradename "VLADIPOR" by "Polymersyntez". After 10 minutes, the composite membrane swelled and the excess mixture was poured off. Subsequently, the composite membrane was dried for 30 minutes at 20° C. and then was dried in a laboratory oven for 10 minutes at 120° C.

The process of coating and drying the same membrane surface was repeated using the remaining one-half of the mixture. The overall consumption of the mixture was 0.264 grams (0.0053 g/sq. cm). The resulting coating on the composite membrane was 1.5-2.0 micrometers thick.

EXAMPLE 4

This Example illustrates the preparation of a composite membrane comprising a hydrophilic polymeric asymmetric membrane coated (1.5-2.0 micrometers thick) with a mixture including an organosiloxane block copolymer according to formula (I) wherein "m" has a value of 13, "n" has the value of 2, "x" has the value of 0.369 and $R^2$ is —$(CH_2)_3$—and where the organosiloxane block is of 70%.

The procedure in Example 3 was followed except that the organosiloxane block copolymer used in Example 3 was replaced by the organosiloxane block copolymer having the above formula and the reverse osmosis cellulose acetate membrane was replaced with a reverse osmosis polyamidic-polysulphonamidic membrane. The polyamidic-polysulphonamidic membrane was type "OPMN-KM" which was about 200 micrometer thick. It was available under the tradename "VLADIPOR" manufactured by Polymersyntez.

EXAMPLE 5

The procedure of Example 3 was followed except that the organosiloxane block copolymer of Example 3 was replaced with the organosiloxane block copolymer produced in Example 2, the toluene was replaced with methylene chloride, and the reverse osmosis cellulose acetate membrane was replaced with a (poly)amide-imidic asymmetric membrane of the general formula:

where n is 80-120. A coating of 1.5-2.0 micrometers thick on the composite membrane was produced.

COMPARATIVE EXAMPLE I

This is a comparative Example illustrating the preparation of a membrane comprising a reverse osmosis cellulose acetate asymmetric membrane (type "MGA-P" sold under the tradename "VLADIPOR" by Polymersyntez) coated with a mixture including an RTV silicon rubber solution described in Comparative Example 2 of U.S. Pat. No. 4,591,440.

The procedure in Example 3 was followed except that the organosiloxane block copolymer used in Example 3 was replaced by an RTV silicon rubber solution of polydimethyl(methylvinyl)siloxane with methylvinylsiloxane section of 0.5% mol.

COMPARATIVE EXAMPLE II

This is a comparative Example illustrating the use of a reverse osmosis cellulose acetate asymmetric membrane of the type referred to as "MGA-P".

COMPARATIVE EXAMPLE III

This is a comparative Example illustrating the use of a hydrophilic reverse osmosis polyamidic-polysulphonamidic membrane of the type referred to as "OPMN-KM".

COMPARATIVE EXAMPLE IV

This is a comparative Example illustrating the use of the (poly)amide-imide asymmetric membrane of the formula shown in Example 5.

EXAMPLE 6

Figure 1:
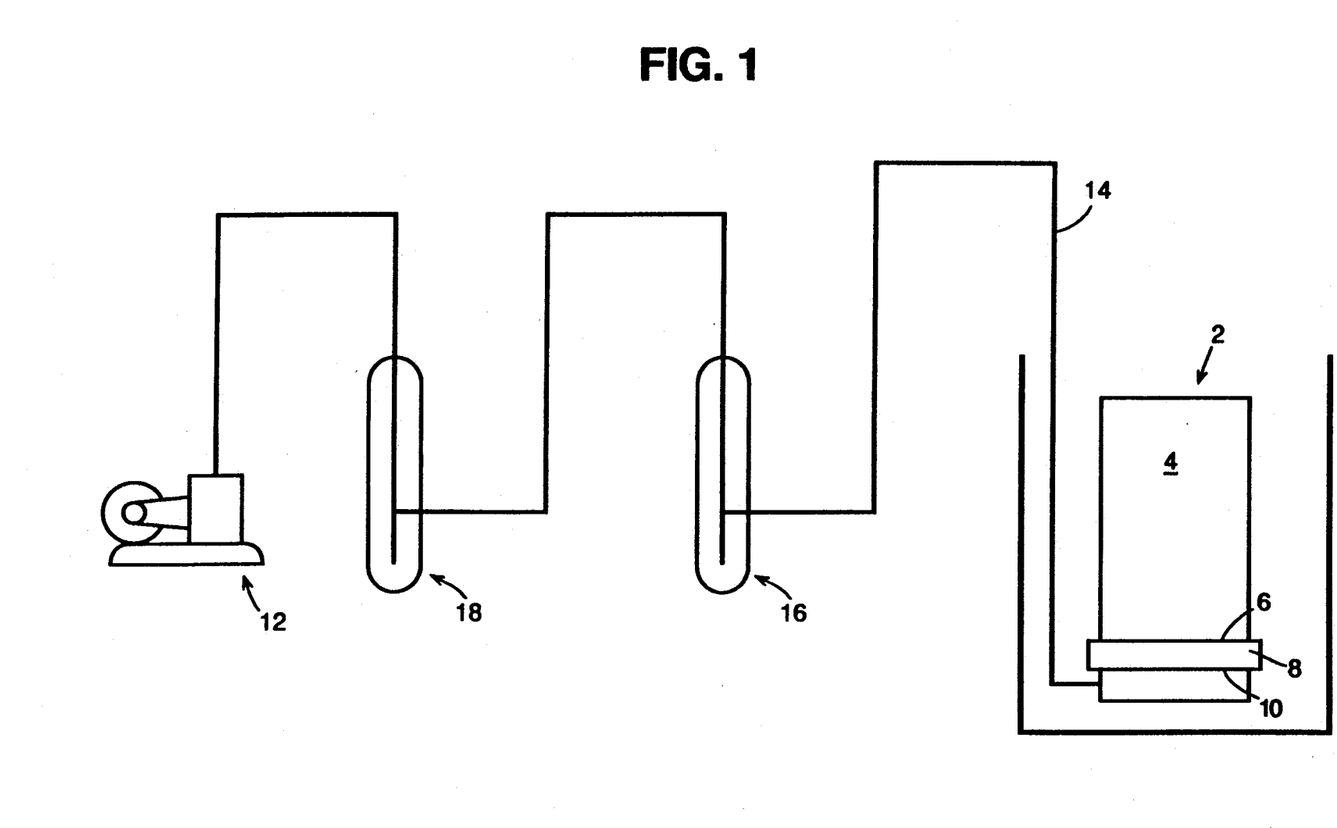
FIG. 1 is a schematic drawing of the pervaporation system employing a high pressure cell equipped with an agitator containing a flat composite membrane according to the present invention.

FIG. 1 shows a schematic drawing of the pervaporation system employed in this example. A 1500 ml stainless steel, high pressure cell 2 equipped with an agitator was employed to contain a feed mixture 4, consisting of a mixture of liquids A and B. The feed mixture in cell 2 was heated by a thermostat to the desired temperature. The feed mixture 4 was circulated on the upstream side 6 of, and over, a flat composite membrane supported by a porous metallic disk 8 of sufficient porosity to avoid disturbing the equilibrium at the downstream side. During circulation of the feed, the downstream side 10 was evacuated to the desired pressure with a vacuum pump 12. Permeate was removed from the downstream side 10 of the membrane 8 via line 14. Connected to line 14 were a series of vacuum trap condensers 16 and 18 cooled by liquid nitrogen, which were used to collect the permeate.

The composite membrane produced in Examples 3, 4 and 5 as well as comparative Examples I, II, III, and IV, were each employed as the flat composite membrane for the separation of liquids A and B. Results of the separation are shown in Table 1.

TABLE 1

| Example Number | Mixture B A | Weight in Feed (% of A) | Permeability (Kg/H-m²) | S.F | Vapor Pressure V of Permeate (mm-Hg) | Temp. (°C.) |
|---|---|---|---|---|---|---|
| 3 | Ethanol-Water | 4.40 | 4.77 | 1.58 | 10-30 | 25 |
| 3 | Ethanol-Water | 4.50 | 7.25 | 1.65 | 10-30 | 50 |
| 4 | Ethanol-Water | 4.40 | 2.55 | 2.56 | 10-30 | 25 |
| 4 | Ethanol-Water | 5.83 | 6.61 | 2.86 | 10-30 | 50 |
| 5 | Ethanol-Water | 4.40 | 4.77 | 3.21 | 10-30 | 25 |
| 5 | Ethanol-Water | 4.40 | 7.12 | 5.53 | 10-30 | 50 |
| 5 | Ethanol-Water | 3.24 | 6.87 | 5.95 | 10 | 50 |
| 5 | Ethanol-Water | 2.15 | 6.50 | 6.44 | 10 | 50 |
| 5 | Ethanol-Water | 1.90 | 6.11 | 6.98 | 10 | 50 |
| 5 | Ethanol-Water | 0.89 | 5.58 | 7.01 | 10 | 50 |
| 5 | Ethanol-Water | 80.0 | 1.70 | 8.05 | 10-30 | 50 |
| 5 | Propanol-Water | 12.8 | 0.92 | 150.0 | 10-30 | 50 |
| 5 | Propanol-Water | 37.0 | 0.85 | 98.0 | 10-50 | 50 |
| 5 | Butanol-Water | 4.0 | 0.80 | 425.0 | 10-70 | 50 |
| 5 | Butanol-Water | 11.8 | 0.89 | 684.0 | 10-70 | 50 |
| 5 | Benzene-Ethanol | 30.67 | 1.40 | 7.04 | 10 | 50 |
| 5 | Benzene-Ethanol | 56.80 | 5.55 | 9.31 | 10 | 50 |
| 5 | Toluene-Ethanol | 90.88 | 4.11 | 4.12 | 15 | 50 |
| 5 | t-Butanol-Ethanol | 92.57 | 7.64 | 4.74 | 10 | 20 |
| Comparative Examples | | | | | | |
| * | Ethanol-Water | 4.40 | 2.20 | 2.9 | 0.1-1 | 25 |
| * | Propanol-Water | 12.2 | 0.85 | 8.9 | 0.1-1 | 25 |
| * | Butanol-Water | 11.8 | 0.35 | 41.0 | 0.1-1 | 25 |
| * | Benzene-Ethanol | 32.4 | 2.9 | 1.3 | 0.1-1 | 25 |
| I | Ethanol-Water | 4.40 | 1.51 | 3.33 | 10-30 | 25 |
| I | Ethanol-Water | 4.45 | 1.47 | 5.15 | 10-30 | 50 |
| I | Ethanol-Water | 30.0 | 0.80 | 3.88 | 10-30 | 50 |
| II | Ethanol-Water | 4.40 | 2.86 | 2.27 | 10-30 | 25 |
| II | Ethanol-Water | 5.92 | 3.82 | 1.57 | 10-30 | 50 |
| III | Ethanol-Water | 4.40 | 1.59 | 2.25 | 10-30 | 25 |
| III | Ethanol-Water | 5.15 | 4.18 | 1.97 | 10-30 | 50 |
| IV | Ethanol-Water | 4.40 | 1.27 | 3.04 | 10-30 | 25 |

TABLE 1-continued

| Example Number | Mixture B A | Weight in Feed (% of A) | Permeability (Kg/H-m²) | S.F | Vapor Pressure V of Permeate (mm-Hg) | Temp. (°C.) |
|---|---|---|---|---|---|---|
| IV | Ethanol-Water | 4.54 | 1.59 | 3.78 | 10-30 | 50 |

*This data was recorded in Aptel et al. Journal of Membrane Science 271 (1976) for a water-permselective membrane consiting of hydrophilic coat of N-vinyl-pyrrolidone grafted on a chemically inert base of PTFE The results in Table 1 for the present invention show a high water permeability. This is a surprisingly and unexpected result because the active surface of the composite membrane is hydrophobic. The above results for the present invention also show an unexpected increase in both of the separation factor and the permeability as the temperature increases from 25° to 50° C. The results further show that, although the permeate is saturated with water during the evaporation process, the separation factor increases with an insignificant decrease in permeability as the alcohol concentration in the feed increases. In addition, the results demonstrate that the pervaporation process of the present invention can be conducted at higher residual permeate pressures with resulting improved permeability and separation factor.

These results demonstrate the ability of the composite membranes of the present invention to reduce the water concentration of an ethanol-water mixture to at least 0.9% while surprisingly resulting in an increase in the separation factor and in no significant reduction in permeability. This contrasts with conventional water-permselective membranes that generally cannot be used to separate water-alcohol mixtures having low water concentrations. Therefore, the data in Table 1 shows that using the composite membrane of this invention an organic component in a liquid mixture can be evaporated effectively over a wide range of concentrations.

EXAMPLE 7

The pervaporation system shown in FIG. 1 was employed except that a hollow fiber permeation cell was substituted for the flat membrane used in Example 6. The procedure in Example 3 was followed except that the reverse osmosis cellulose acetate flat membrane was replaced with a polyamidic assymetric hollow fiber membrane, a feed of an ethanol-water mixture containing 10.5% water, a vapor pressure of 40-50 mm Hg and a feed temperature of 20° C. were used. The separation factor was 32.1 and the permeability was 0.97 kg/H-m².

EXAMPLE 8

This Example illustrates the preparation of a composite membrane comprising a poly(amide)-imidic hydrophilic asymmetric membrane coated with the polymer produced in Example 1.

1.0 grams of the organosiloxane block copolymer of Example 1 [organosiloxane block of 75% by weight], 0.015 grams of oligohydride ethylsiloxane (product 136-41, TU-10834-76) and 17.0 grams of toluene were placed in a flask (equipped with an agitator and a reverse cooler). The mixture was stirred for about 8 hours at about 20° C. until the polymer was completely dissolved.

A catalyst of 0.015 grams of chloroplatinic acid in a solution of tetrahydrofuran was added. The resulting mixture was stirred for an additional 10 minutes at 20° C. One half of the resulting mixture was poured onto the horizontally placed surface of a (poly)amide-imidic hydrophilic asymmetric membrane at room temperature. After 10 minutes, the composite membrane swelled. The excess mixture was removed by pouring off. Subsequently, the composite membrane was dried in a laboratory oven for 30 minutes at 20° C. and then for 10 minutes at 120° C.

The process of coating and drying the same membrane surface was repeated using the remaining one-half of the mixture. The overall consumption of the mixture was 0.53 grams (0.0106 g/sq. cm). The resulting coating on the composite membrane was 9-10 micrometers thick.

EXAMPLE 9

The setup shown in FIG. 1 and described in Example 6 was employed in this example except the feed mixture was heated to 50° C. and the downstream side of the permeation cell was evacuated to 15 mm Hg. The composite membrane produced in Example 8 was employed as the flat composite membrane. Separation results using an ethanol-water mixture are shown in Table 2.

TABLE 2

| Weight in Feed (% Ethanol) | Weight in Permeate (% Ethanol) | S.F. | Permeability (Kg/h · m₂) |
|---|---|---|---|
| 99.87 | 79.23 | 41.11 | 1.38 |
| 99.16 | 75.13 | 39.07 | 1.61 |
| 96.85 | 51.3 | 26.1 | 1.69 |
| 94.98 | 36.7 | 22.16 | 1.75 |
| 93.67 | 35.64 | 16.1 | 2.92 |
| 87.38 | 34.1 | 14.0 | 2.12 |
| 84.38 | 30.12 | 12.5 | 2.29 |
| 81.55 | 24.82 | 13.24 | 2.15 |
| 74.22 | 24.05 | 9.09 | 2.15 |
| 54.97 | 16.17 | 6.27 | 1.19 |
| 48.37 | 10.78 | 7.75 | 1.41 |
| 45.09 | 7.92 | 9.55 | 1.04 |
| 40.99 | 6.08 | 11.04 | 0.64 |
| 32.34 | 6.8 | 6.55 | 0.59 |
| 20.01 | 7.3 | 8.05 | 1.0 |
| 14.1 | 5.89 | 7.62 | 0.98 |
| 7.67 | 1.12 | 8.05 | 0.57 |

As shown in Table 2, a final product having less than 0.15% water may be obtained using the composite membrane of the present invention. Surprisingly, the separation was accomplished with both a significantly high separation factor and an increased permeability. Contrary to the prior art, these results demonstrate that a decreased water content in the feed results in an increase in separation factor with little or no significant decrease in permeability. The best results were obtained at water concentrations of 25% and less.

Various modifications will become possible for those skilled in the art after receiving the teachings of the present disclosure without departing from the scope thereof.

What is claimed is:

1. A composite membrane comprising a hydrophilic asymmetric membrane coated with a mixture of:
   (a) a poly(methylvinyl)siloxane urethane block copolymer having the structural formula (I) depicted below:

wherein: m has a value of 8.0–18.0;
n has a value of 1.0–5.0;
x has a value of about 0.2 to about 0.7;
y has a value of 1 minus the value of x;
R is $R^1$ is

—CH$_2$CH$_2$NCH$_2$CH$_2$—

$R^2$ is a $C_1$–$C_5$ lower alkylene group;
v is a vinyl group; and
Me is a methyl group;
(b) a linking reagent; and
(c) a catalytically effective amount of a hydrosilylation catalyst.

2. A composite membrane according to claim 1, wherein m has a value of 14.0; n has a value of 1.0; x has a value of about 0.224; and $R^2$ is a $C_1$ lower alkylene having the formula —CH$_2$—.

3. A composite membrane according to claim 1 wherein m has a value of 13.0; n has a value of 2.0; x has a value of 0.369; and $R^2$ is a $C_3$ lower alkylene having the formula —(CH$_2$)$_3$—.

4. The composite membrane according to claim 1, wherein the hydrophilic asymmetric membrane is selected from the group consisting of a cellulose acetate, polyamide, polyamide-imide, and polyamidic-polysulphone.

5. A composite membrane comprising a hydrophilic asymmetric membrane coated with a mixture of (a) an organosiloxane block copolymer having the general formula

—[A—B]— wherein: A is an organosiloxane polymer having at least one vinyl group bonded to at least one silicon atom in the organosiloxane polymer and B is an organic polymer block other than an organosiloxane polymer defined as A; (b) a linking reagent; and (c) a catalytically effective amount of a hydrosilylation catalyst.

6. The composite membrane according to claim 5, wherein B is an organic polymer selected from the group consisting of a polycarbonate, a polysulphone, a polyurea, a polyether and a polyimide.

7. The composite membrane according to claim 6, wherein A is the organosiloxane block copolymer having the structural formula depicted below:

where:
m has a value of 8.0–18.0;
n has a value of 1.0–5.0;
Me is a methyl group of hydrogen;
V is at least one vinyl group with the remaining compounds selected from the group consisting of vinyl and Me; and
l has a value of 1–3.

8. The composite membrane according to claim 6, wherein the polycarbonate has the structural formula where k has a value of 7–12 and each $R^3$ is selected from the group consisting of a $C_1$–$C_5$ lower alkylene or where the $R^3$ groups in combination are wherein the polysulphone has the structural formula where k has a value of 7–12 and each $R^3$ is selected from the group consisting of a $C_1$–$C_5$ lower alkylene or where the $R^3$ groups in combination are wherein the polyurea has the structural formula wherein the polyether has the structural formula where l has a value of 1-3 and $R^3$ is a compound selected from the group consisting of a $C_1$-$C_5$ lower alkylene; and wherein the polyimide has the structural formula where k has a value of 7-12.

9. The composite membrane according to claim 8, wherein A is the organosiloxane block copolymer having the structural formula depicted below:

where:
m has a value of 8.0-18.0;
n has a value of 1.0-5.0;
Me is a methyl group or hydrogen;
V is at least one vinyl group - with the remaining compounds selected from the group consisting of vinyl and Me; and
l has a value of 1-3.

10. The composite membrane according to claim 5, wherein the linking reagent is an oligohydride ethylsiloxane.

11. The composite membrane according to claim 5, wherein the hydrosilylation catalyst is selected from the group consisting of platinum (IV) complexes, olefin platinum complexes and chloroplatinic acid.

12. The composite membrane according to claim 5, wherein the hydrophilic asymmetric membrane is selected from the group consisting of a cellulose acetate, polyamide, polyamide-imide, and polyamidic-polysulphone.

* * * * *